United States Patent Office 3,780,000
Patented Dec. 18, 1973

3,780,000
AROMATIC POLYMERS WITH THIOETHER GROUPS
Ronald George Feasey, Knebworth, and John Brewster Rose, Letchworth, England, assignors to Imperial Chemical Industries Limited, London, England
No Drawing. Filed Oct. 29, 1971, Ser. No. 193,982
Int. Cl. C08g *15/00, 23/00*
U.S. Cl. 260—79.3 M
2 Claims

ABSTRACT OF THE DISCLOSURE

An aromatic polymer comprising units having the formula

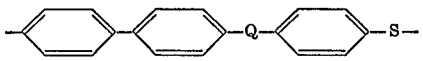

where Q is —CO— or —SO$_2$— and may vary from unit to unit in the polymer chain, either alone or copolymerised with other units.

---

This invention relates to new aromatic polymers and to new chemical intermediates from which they may be produced.

In the specifications of British Pats. 1,153,035 and 1,153,528 and Belgian Pat. 729,715, the disclosures of which are incorporated herein by reference, there are described methods for the production of aromatic polymers in which a dihalobenzenoid compound having each halogen atom activated by an electron-attracting group is caused to react with a substantially equivalent amount of an alkali metal hydroxide. The dihalobenzenoid compound may, in particular, have the formula

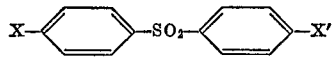

or

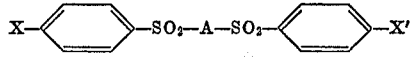

where X and X' are halogen atoms (preferably chlorine or fluorine) and A is a bivalent aromatic radical of, for example, benzene, naphthalene or biphenyl. Also described therein and in British specification 1,177,183 (the disclosure of which is incorporated herein by reference) is the production of aromatic polymers whose molecular chains comprise units of the formula

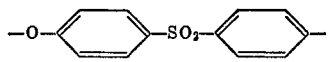

in which an alkali metal salt of a halophenol of the formula

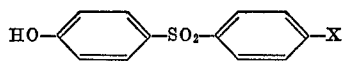

(where X is halogen) is polymerised by the displacement of alkali metal halide.

In British specifications 1,078,234 and 1,133,561 (the disclosures of which are also incorporated herein by reference), there is described a method for the production of aromatic polymers in which a dihalobenzenoid compound having each halogen atom activated by an electron-attracting group is caused to react with a di-(alkali metal) salt of a dihydric phenol in the liquid phase of an inert highly polar organic solvent. The dihalobenzenoid compound may in particular have the formula

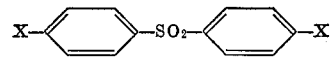

(where X is halogen, preferably chlorine or fluorine) and the dihydric phenol may in particular be one of the following:

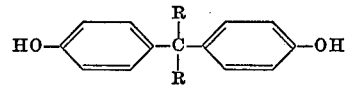

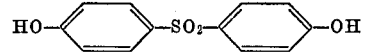

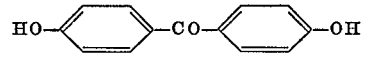

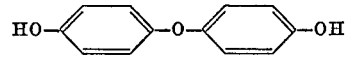

(where the R group represents hydrogen, lower alkyl, lower aryl and the halogen-substituted groups thereof).

According to the present invention, aromatic polymers are provided comprising repeating units having the formula

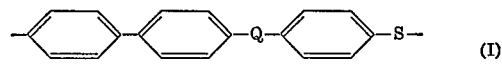

where Q is —CO— or —SO$_2$— and may vary from unit to unit in the polymer chain.

A homopolymer consisting essentially of units having the Formula I where Q is —SO$_2$— may be crystalline with a crystal melting point (measured by differential thermal calorimetry) of about 330° C. compared with less than 300° C. for a polymer consisting essentially of repeat units having the Formula II

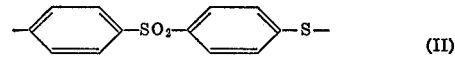

Since excellent thermal stability of aromatic polysulphones is maintained, the homopolymer of the invention is suitable in situations where prolonged exposures to high temperatures is expected.

The polymers of the invention are readily prepared from halophenols III, where X is a halogen atom, in the presence of alkali metal fluoride or from the alkali metal salts of halophenol III by the displacement of alkali metal halide.

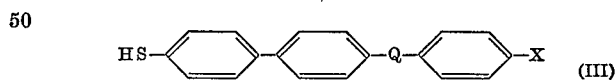

Halophenols (III) may be prepared by either of the following routes:

(1)

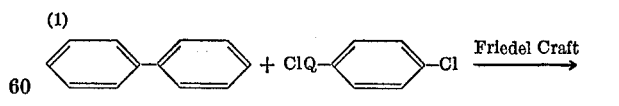

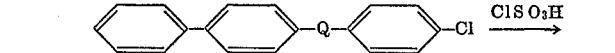

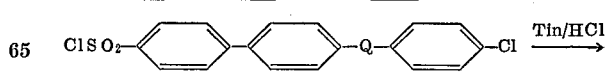

(2) 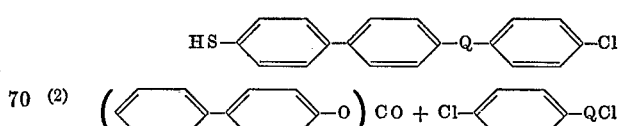

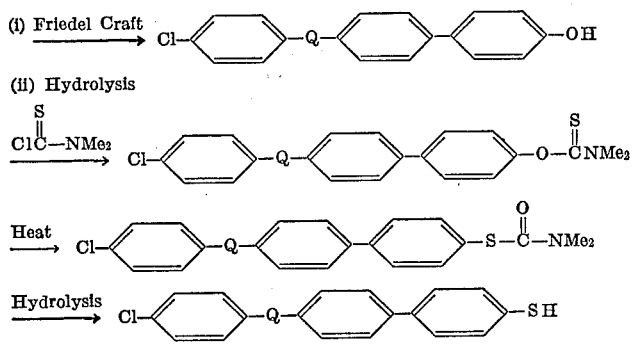

Copolymers according to the invention may be made for example by carrying out either of the above reactions in the presence of halophenols, halothiophenols, dihydric phenol/dihalobenzenoid compound and dihydricthiophenol/dihalobenzenoid compounds where the halogen atoms are activated by electron attracting groups in ortho or para positions and where alkali metal salts of phenols and thiophenols are used when alkali metal salt of thiophenol III is used.

The halogen atom X is preferably chlorine or bromine. Bromine derivatives are relatively expensive and although they resemble the chlorine derivatives in performance they would seem to offer no advantages. Fluorine derivatives are generally less suitable.

The alkali metal cation is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged heteroatom (for example a quaternary ammonium cation such as tetramethylammonium) stable under the conditions of the reaction, and the term "alkali metal salt" as used herein is deemed to refer also to salts containing such onium cations.

The polymerisation may be carried out in the melt or in the presence of a polar liquid diluent which itself is unreactive under the conditions employed and is a solvent for the resultant polymer and preferably also for the polymerisable starting material. The reaction may be carried out in an extruder. The reaction vessel should in any case be made of or lined with a material which is inert to alkali and to alkali metal halides under the conditions employed.

Suitable polar liquids for the reaction include: the lower dialkyl and cyclic alkylene sulphoxides and sulphones (e.g. dimethyl sulphoxide and 1,1-dioxothiolan), nitriles (e.g. benzonitrile), diaryl ketones (e.g. benzophenone), diaryl sulphoxides and sulphones, ethers (e.g. dioxane, diethylene glycol dimethyl ether, diphenyl ether, methoxyphenyl ethers) and non-olefinic tertiary alcohols (e.g. t-butanol). Mixtures of such substances may conveniently be used, e.g. when one or more components of the mixture would otherwise be solid at the reaction temperature. The amount of the liquid used is desirably sufficient to ensure that none of the starting materials are in the solid state in the reaction mixture but not so large as to be economically disadvantageous.

A reagent to neutralise any sulphur- or oxygen-containing anions may be introduced at the end of the polymerisation. Reactive monofunctional halides, for example methyl chloride, are particularly suitable.

The alkali metal halide formed in the polymerisation can be removed from the resultant high polymer by any suitable means. For example, it can be extracted from the high polymer using water, or the polymer itself can be dissolved in a strongly polar organic solvent (for example dimethyl formamide, 1-methyl-2-oxo-pyrrolidine, dimethyl sulphoxide, 1,1-dioxothiolan or nitrobenzene) and then reprecipitated by addition to a liquid such as water which is miscible with the polymer solvent but itself a non-solvent for the polymer.

When the polymer is formed in solution, a convenient procedure is to add the reaction mixture (which may be decanted or filtered from solid alkali metal halide) to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can be subsequently washed out with water.

The aromatic polymers of the invention may also be made by the polycondensation of a sulphonyl chloride of the formula

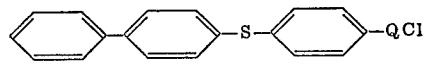

in the presence of a Friedel-Crafts catalyst, and copolymers may be made with other sulphonyl chlorides or mixtures of disulphonyl chlorides and unsubstituted aromatic compounds, for example those of the formulae

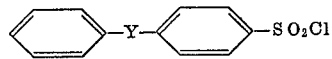

or

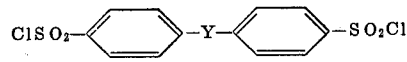

and

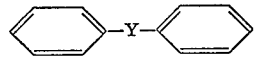

where Y is oxygen or sulphur. Suitable procedures for such polymerisations where Q is —SO$_2$— are described in British specifications 1,016,245, 1,060,546 and 1,109,842.

The polymer of the invention may be used in any of the methods available for the processing of thermoplastic materials such as for example mouldings, fibres, films (including oriented films), surface coatings and adhesives. They may be blended with other thermoplastic materials and with pigments and fillers, for example fibrous reinforcements, solid lubricants and abrasives. The polymers may be oxidised to form the corresponding polyarylene sulphone by for example the process of German specification 1,938,806.

The invention is illustrated by the following examples.

EXAMPLE 1

Chlorosulphonic acid (66 cm.$^3$; 1.00 mole) was dripped into a stirred solution of 4-(4-chlorophenylsulphonyl) biphenyl (109.5 g.; 0.33 mole) in chloroform (250 cm.$^3$) during 1.5 hours, whilst hydrogen chloride evolved. The resulting solution was heated at reflux for 3 hours and then allowed to cool. Ice (ca. 100 g.) was added to the reaction mixture to give a milky mixture, which was extracted with chloroform. The combined chloroform extracts were dried over anhydrous sodium carbonate then evaporated to an off-white solid which was recrystallised from 1,2-dichloroethylene/petrol (B.P. 80–100° C.) to yield 4-(4-chlorophenylsulphonyl)-4'-chlorosulphonyl biphenyl (78.8 g.; 55% of theoretical yield) which had M.P. 171° C. and infra-red and mass spectra consistent with the structure

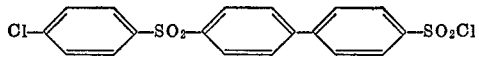

Powdered tin (23.7 g.; 0.2 mole) was added to a solution of 4-(4-chlorophenylsulphonyl)-4'-chlorosulphonyl biphenyl (8.54 g.; 0.02 mole) in acetic acid (120 cm.³). The mixture was heated to reflux and concentrated hydrochloric acid (35 cm.³; 0.4 mole) was dripped into it during 2 hours; the resulting mixture was maintained at reflux for a further 2 hours. The reaction mixture was allowed to cool, was diluted with water (ca. 100 cm.³) and the solid which precipitated was collected, washed with water, then ethanol and finally petrol (B.P. 40–60° C.) and dried to yield crude 4-(4-chlorophenylsulphonyl)-4'-mercaptobiphenyl. The crude product was purified by reprecipitation by hydrochloric acid from aqueous potassium hydroxide solution followed by recrystallisation from 1,2-dichloroethylene/petrol (B.P. 100–120° C.) to yield 4.15 g. (58% of theoretical yield) of a white solid which contained carbon 59.9% and hydrogen 3.8%

($C_{18}H_{13}O_2S_2Cl$ requires 59.9%; H 3.6%), and had mass, infra-red and nuclear magnetic resonance spectra consistent with the structure

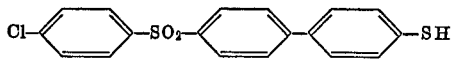

A sample (10.82 g.; 0.03 mole) of 4-(4-chlorophenylsulphonyl)-4'-mercapto biphenyl, anhydrous potassium fluoride (3.66 g.; 0.063 mole) and sulpholane (12 cm.³) were charged to a 100 cm.³ round bottom flask fitted with a stirrer, dry nitrogen inlet, reflux condenser and nitrogen outlet. The mixture was stirred and heated in an oil bath at 200° C. After 80 minutes, more sulpholane (10 cm.³) was added and, after a further 10 minutes, the oil bath was cooled to 150° C. and diluted with dimethyl formamide (50 cm.³). The temperature of the reaction mixture was returned to 200° C. and the reaction was continued for a further 5 hours. The resulting mixture was cooled, poured into methanol (300 cm.³) and the insoluble product was collected, washed with hot water and dried in vacuo at 100° C.

The dry product was crystalline to X-rays, had a crystal melting point of 330° C. and was compression moulded at 340° C. into clear amber film.

EXAMPLE 2

Aqueous potassium hydroxide solution (3.44 g.; 0.03 mole; 114.5 g./mole) was added to a solution under nitrogen of 4-(4-chlorophenyl sulphonyl)-4'-mercaptobiphenyl (10.83 g.; 0.03 mole) in 1,1-dioxothiolan (15 cm.³) which had been degassed by bubbling nitrogen through the solvent for 0.5 hour in a round bottomed flask (capacity 100 cm.³) fitted with a stirrer and a Dean and Stark still head. The flask was immersed in an oil bath. Benzene (25 cm.³) similarly degassed was then added and water was removed by azeotropic distillation. Benzene was distilled from the flask and then the temperature of the oil bath was raised from 140° C. to 200° C. The reaction was continued at this temperature for 3.5 hours and the resulting mixture was macerated with water, washed with boiling water (2× 400 cm.³) and methanol (2× 300 cm.³) and dried. The resulting polymer had repeat units

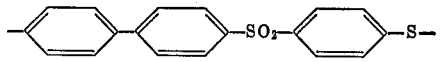

was crystalline with a Tm of 330° C. and was compression-moulded at 350° C. into a thin, clear amber film.

We claim:
1. A film- and fiber forming aromatic polymer consisting essentially of repeating units having the formula

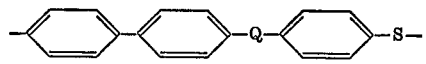

where Q is —CO— or —SO₂— and may vary from unit to unit in the polymer chain.

2. A film- and fiber forming aromatic polymer according to claim 1 consisting essentially of repeating units having the formula

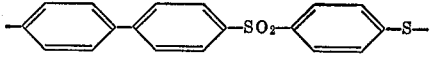

References Cited

UNITED STATES PATENTS

| | | | |
|---|---|---|---|
| 3,391,128 | 7/1968 | Handlovits | 260—79 |
| 3,418,277 | 12/1968 | Cohen | 260—49 |
| 3,432,468 | 3/1969 | Gabler | 260—47 |
| 3,441,538 | 4/1969 | Marks | 260—49 |

JOSEPH L. SCHOFER, Primary Examiner

C. A. HENDERSON, Jr., Assistant Examiner

U.S. Cl. X.R.

260—63 R, 591, 607 A

UNITED STATES PATENT OFFICE
CERTIFICATE OF CORRECTION

Patent No. 3,780,000        Dated December 18, 1973

Inventor(s) Ronald George Feasey et al

It is certified that error appears in the above-identified patent and that said Letters Patent are hereby corrected as shown below:

In the heading Foreign Application Priority Data should be added as follows:

-- Nov. 13, 1970    Great Britain    54131/70
   May 19, 1971     Great Britain    15793/71
   Sept. 8, 1971    Great Britain    41920/71 --.

Signed and sealed this 30th day of April 1974.

(SEAL)
Attest:

EDWARD M. FLETCHER, JR.
Attesting Officer

C. MARSHALL DANN
Commissioner of Patents